United States Patent [19]
Schuster

[11] 3,884,162
[45] May 20, 1975

[54] INCINERATOR PLANT FOR PRE-TREATED INDUSTRIAL WASTES

[75] Inventor: Ernst Schuster, Gummersbach, Germany

[73] Assignee: L. & C. Steinmüller GmbH, Gummersbach, Germany

[22] Filed: Jan. 21, 1974

[21] Appl. No.: 435,090

[30] Foreign Application Priority Data
Jan. 23, 1973  Germany.............................. 2303117
Dec. 17, 1973  Germany.............................. 2362691
Dec. 17, 1973  Germany.............................. 2362690
Dec. 17, 1973  Germany.............................. 2362689

[52] U.S. Cl.................. 110/8 R; 110/8 P; 110/119; 241/23
[51] Int. Cl................................................. F23g 7/00
[58] Field of Search............ 110/7 R, 8 R, 8 C, 8 A, 110/8 P, 119; 241/18, 23

[56] References Cited
UNITED STATES PATENTS
| | | | |
|---|---|---|---|
| 2,879,005 | 3/1959 | Jarvis................................ | 241/23 X |
| 3,457,881 | 7/1969 | Test et al................................ | 110/7 |
| 3,685,467 | 8/1972 | Morrill..................................... | 110/8 |
| 3,718,284 | 2/1973 | Richardson............................ | 241/23 |
| 3,734,036 | 5/1973 | Abos........................................ | 110/8 |
| 3,736,111 | 5/1973 | Gardner et al....................... | 110/8 X |
| 3,771,729 | 11/1973 | Frable................................... | 241/23 |

*Primary Examiner*—Kenneth W. Sprague
*Attorney, Agent, or Firm*—Walter Becker

[57] ABSTRACT

An incinerator plant for burning pre-treated industrial wastes which in barrels or the like with different contents and of unknown composition are fed into the incinerator plant, the pre-treatment of the pre-treated industrial wastes being effected by deep freezing the barrels with contents or the barrel contents or by evaporating the barrel contents under exclusion of air while supplying evaporating heat directly or indirectly or by mixing the barrel contents with substances of addition or leaning substances. The incinerator plant includes means for sorting the barrels, emptying same, comminuting the barrel contents and the barrels, dosing means for dosing the waste material to be incinerated to a combustion chamber which latter is followed by a post combustion chamber and by a flue gas cooling device as well as by a flue gas washing device and a flue gas heating device with flue means.

4 Claims, 3 Drawing Figures

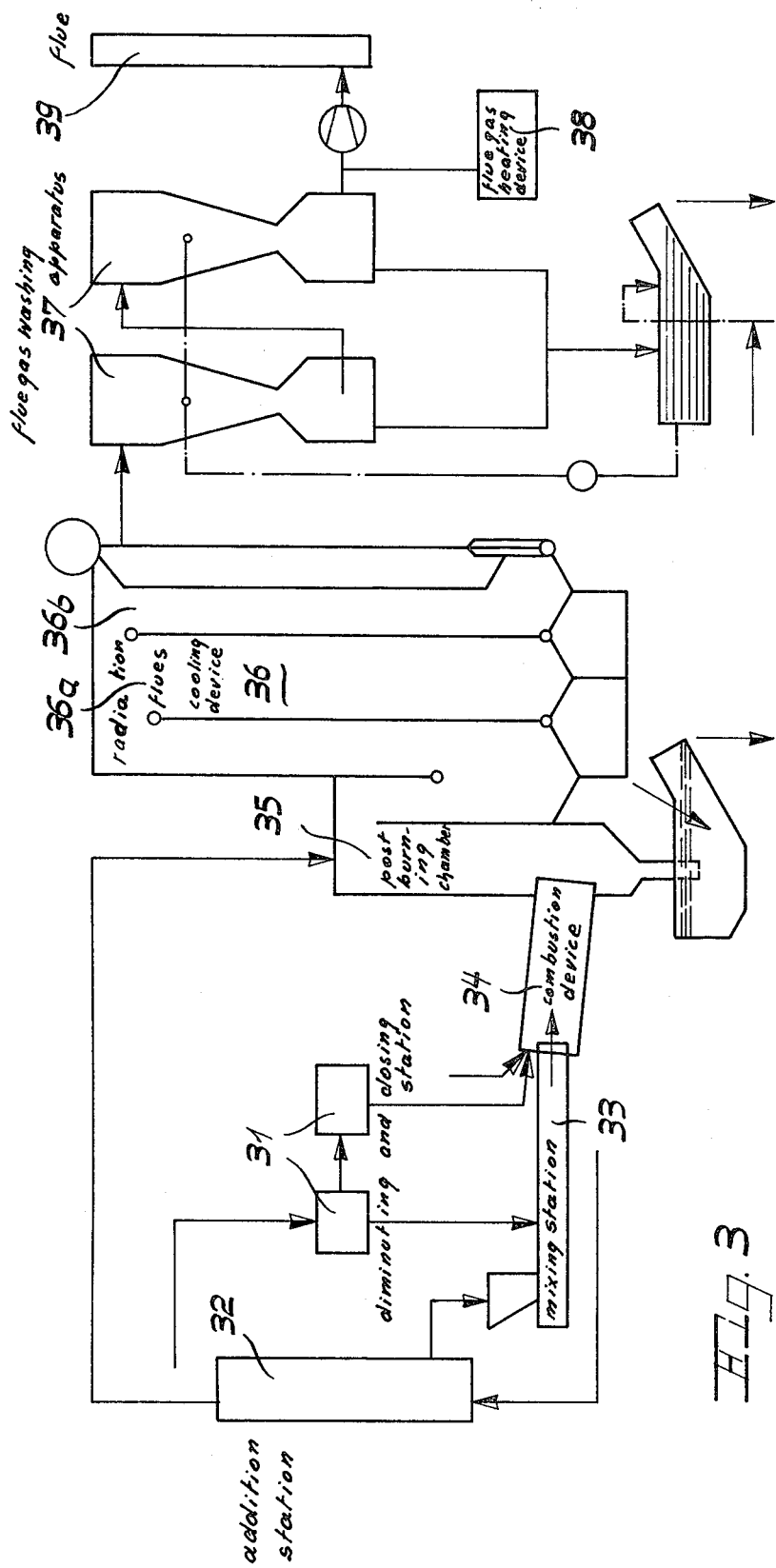

INCINERATOR PLANT FOR PRE-TREATED INDUSTRIAL WASTES

The present invention relates to an incinerator plant for pre-treated industrial wastes which are fed into the incinerator in barrels, or the like, with different content and unknown composition, the pre-treatment of the industrial wastes being effected by deep freezing of the barrels or barrel contents, or by volatilizing of the barrel contents under exclusion of air with direct or indirect heat supply, or by mixing the barrel contents with additional or leaning substances, said incinerator plant also comprising a sorting device for the barrel contents, a discharging device, a comminuting device and a dosing station as well as a station for admixing and intermixing the wastes and the additional materials to be added.

The combustion of industrial wastes, especially of the chemical industry, presents the operators of incinerator plants in which wastes are burned with problems which are difficult to solve. This difficulty is due to the property and composition of such wastes which differ in most instances fundamentally from household refuse.

Wastes from the chemical industry have, for instance, higher heating values and are obtained in solid, paste and liquid form. They have corrosive properties, frequently have strong odors, and in most instances are highly toxic while having the tendency to self-ignite. Therefore, they cannot be intermixed with ordinary household refuse in a bunker, and can be introduced into the fire or combustion chambers with specially designed devices only.

Chemical waste substances contain atoms in their molecules which, during the combustion of such wastes, emit air-foreign substances so that the flue gases have to be subjected to washing.

In view of the fact that the content of the barrels, or the like, differ from each other and are of unknown composition, in particular combustion technical problems are encountered. The combustion technical problems can be mastered to a great extent by subjecting the contents of said barrels to a pre-treatment and burning the same thereafter.

Methods of incinerating pre-treated industrial wastes have been suggested according to which the pre-treatment is effected either by deep freezing the barrels or their contents, by evaporating the contents of said barrels under exclusion of air with direct or indirect supply of the volatilizing heat, or by mixing the barrel contents with additional or leaning material or substances.

According to this method, the course of combustion in the combustion chamber is so controlled that the quantity of combustion air introduced into the combustion chamber and based on the hourly quantity of wastes to be processed, the heating value and the air excess coefficient, is so selected and determined that the pre-treated wastes introduced per time unit, especially the wastes which react at the fastest rate, will be burned completely. There has furthermore become known a method and a device for treating wastes, especially refuse, according to which the refuse is first finely comminuted whereby the finely comminuted waste is conveyed into an incinerator furnace which is preheated to a certain high temperature so that the combustible components of the wastes will support the combustion. This known method, however, requires wastes which can actually be comminuted. Paste-like and liquid wastes cannot be treated with this known method. In addition thereto, there exists the difficulty of dosing additions into the combustion chamber, which additions, however, are necessary under all circumstances in order to realize a complete, i.e., soot-free combustion with the quantity of combustion air introduced in the combustion chamber and based on the hourly quantity of wastes introduced into the combustion chamber, the respective heat value and air excess coefficient.

Furthermore, a method has become known by means of which sulfurdioxide and sulfurtrioxide can be absorbed from waste gases. This method, however, is unsuitable for treatment of industrial wastes or the combustion gases obtained therefrom.

The capability of reaction, especially of chemical wastes, is in part rather high. An intermixing of these substances is not possible for reasons of safety. Therefore, for quite some time the wastes have been placed into barrels of the above mentioned type of different sizes and have been transported to the incinerator plants. Aside from the fact that these one-way barrels have to be bought in part, this method is at present the most favorable one for the transport to an incinerator plant. However, also with this method a number of difficulties are encountered which do not occur, for instance, when burning liquid wastes supplied in tanks, such as old oil. These defined waste liquids as, for instance, old oil may be pumped to the burner in the firing chamber or they may be pressed thereinto by inert gas. For waste substances in barrels this possibility is not available. Other ways have to be followed.

Aside from the above mentioned heretofore suggested methods, the known methods are technically not in a position to burn industrial wastes in a soot-free manner which are delivered to an incinerator plant in barrels with different contents and unknown composition.

It is, therefore, an object of the present invention for the above mentioned methods of burning industrial wastes with pretreatment of said wastes either by deep freezing of the barrels or barrel contents, or by volatilizing the barrel contents under exclusion of air with direct or indirect heat supply or by mixing the contents of barrels with additional or leaning substances, to create an incinerator plant in which this method for the specific treatment type can be carried out without any difficulties.

This object and other objects and advantages of the invention will appear more clearly from the following specification, in connection with the accompanying drawings, in which:

FIG. 1 diagrammatically shows an incinerator plant according to the invention, in which the pre-treatment is effected by deep freezing of the barrel or barrel contents.

FIG. 3 shows an incinerator plant according to the invention, in which the pre-treatment of the wastes is effected by mixing the contents of the barrels with additional or leaning substances.

The incinerator plant according to the invention comprises a sorting device for sorting the barrel or barrel contents, a discharging device, a comminuting device and a dosing station as well as a station for supplying the additional material, and a mixing station for the wastes and additional substances. These known plant components are, according to the present invention, furthermore supplemented by a post-burning chamber following the combustion chamber, a flue gas cooling device, a flue gas washing device, and a flue gas heating device with a flue for the flue gas. According to a further development of the invention, it is suggested that the flue gas washing device is preceded by a flue gas dust withdrawal device. This flue gas de-dusting device may comprise one or more electro-filters.

Figure 1:
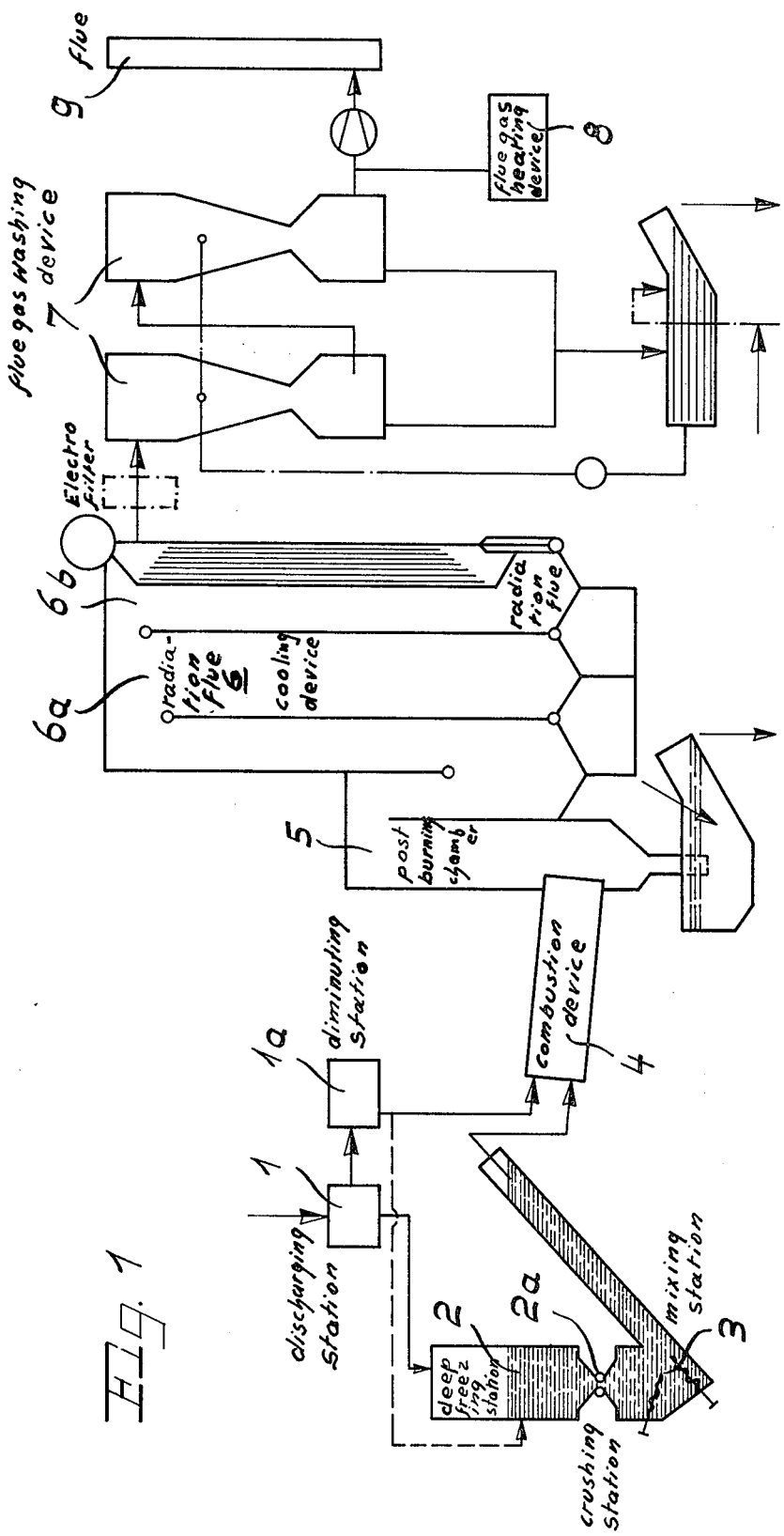

Referring now to the drawings in detail, the plant illustrated in FIG. 1 comprises a preparing section which includes a discharging station 1 for the barrels and a comminuting station 1a for the empty barrles and the solid barrel contents, a deep freezing station 2, a crushing station 2a and a mixing station 3. From the mixing station 3, the pre-treated deep frozen wastes pass into the combustion device 4 which with this embodiment is formed by a rotary furnace. Instead of the rotary furnace 4 also a muffled furnace may be employed. The burning device 4 is followed by a post-burning chamber 5 which forms a unit with the burning device. When the flue gases have passed through the post-burning chamber 5 they are cooled, for which purpose as cooling device a steam generator 6 is employed. This generator 6 comprises a plurality of radiation flues 6a and 6b with contact heating surfaces which may be provided with fins. For purposes of cooling the flue gases, the employment of a steam generator is not a necessity. It will be evident that also other cooling devices, for instance, a chamber into which water is injected or air-cooled installations may be employed.

If waste materials are burned which emit substances which affect ecology, it is necessary to have a flue gas washing apparatus 7 follow the flue gas cooling device 6. In the flue gas washing apparatus 7, the flue gases are cooled down to 100°C. and the harmful substances are separated. Depending on the composition of the flue gases, it may become necessary to have one or more dot-dash shown electro-filters precede the flue gas washing apparatus. In order to avoid the formation of steam when the flue gases leave the flue 9, it is expedient to heat the flue gases cooled in the washing apparatus 7 by a flue gas heating device 8 to a temperature at which the formation of steam clouds will be prevented when the gases leave the flue 9. The flue gas heating device 8 may be installed not only at the place shown in FIG. 1, but may also, for instance, as heat exchanger be arranged ahead of the flue gas washing apparatus 7.

Figure 2:
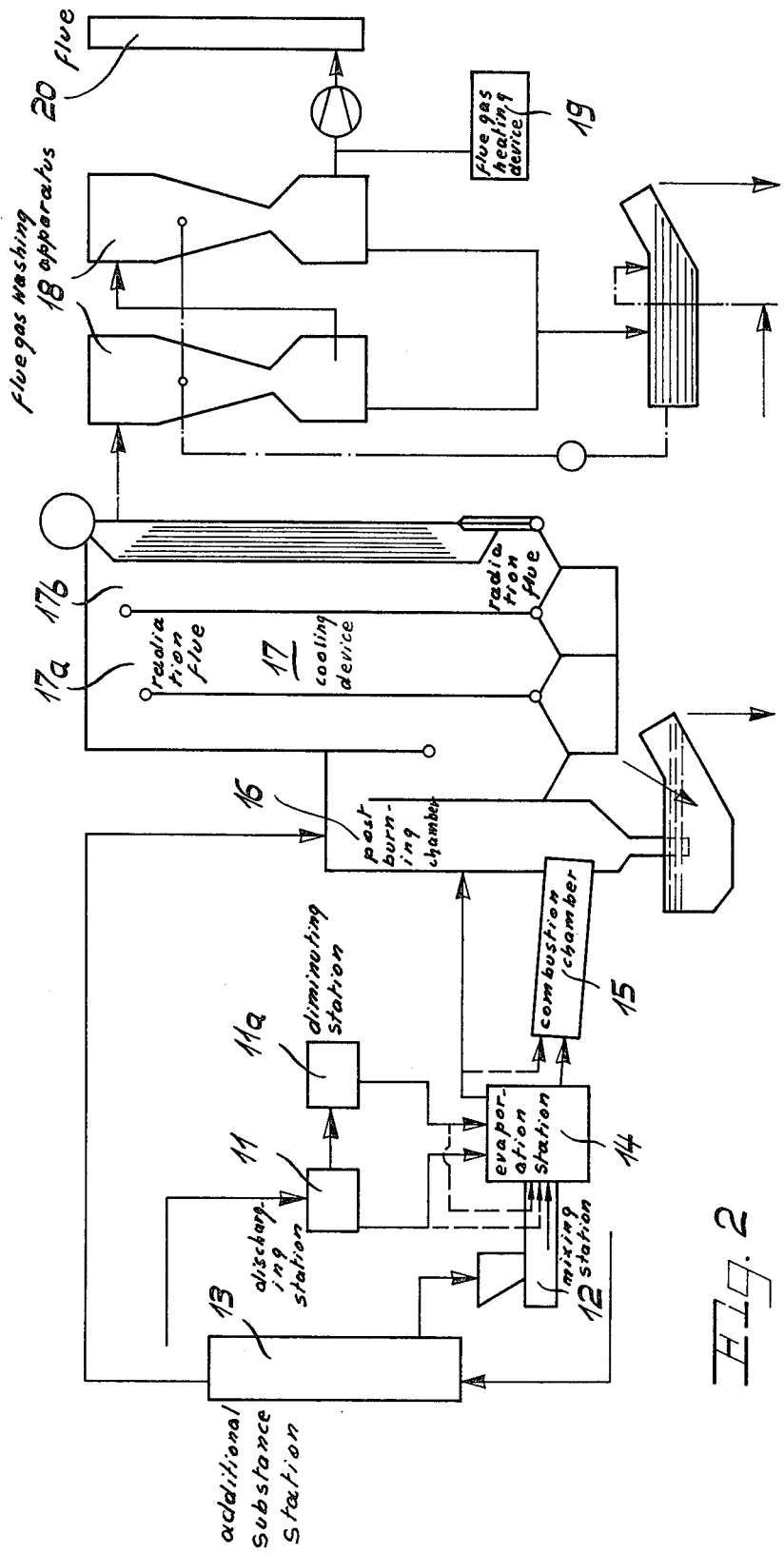
FIG. 2 shows an incinerator plant according to the invention in which the pre-treatment of the wastes is effected by volatilizing the contents of the barrel under air exclusion with direct or indirect heat supply.

In the plant according to the invention, as illustrated in FIG. 2, the preparing range comprises a discharging station 11 for the barrels and a comminuting station 1a for the empty barrels and solid contents of the barrels and as the case may be, may also comprise a mixing station 12 with the addition of additional materials from the station 13, and an evaporation station 14. The contents of the barrels as well as the crushed solid barrels may by bypassing the mixing station 12 be introduced directly into the volatilizing station 14 and may be passed through the same by suitable conveying devices. From the station 14, the evaporated or volatilized waste particles pass directly into the post-burning chamber 16 or into the combustion chamber 15 where they are burned together with the solid non-volatilized or non-volatilizable waste particles from the volatilizing station 14. The station 14 may comprise one or a plurality of chambers, for instance, also rotary furnaces which, in conformity with the different evaporation points of the various waste groups are subjected to different temperatures. The combustion device 15 is followed by a post-burning chamber 16 which together with the combustion device 15 forms a unit. Adjacent the post-burning chamber 16 the flue gases are cooled, for which purpose as cooling device a steam generator 17 is employed. This generator 17 comprises a plurality of radiation flues 17a and 17b with contact heating surfaces which may be designed as finned walls.

For purposes of cooling the flue gases, the employment of a steam generator is also in this instance not a necessity. It will be evident that also other cooling devices may be employed, as for instance, a chamber into which water is injected, or air-cooling devices. If waste materials are burned which emit substances harmful to the ecology, it will be necessary to have a flue gas washing apparatus 18 follow the flue gas cooling device 17. In the flue gas washing device 18, the flue gases are again cooled to a temperature below 100°C, and the harmful substances are separated or deposited. Depending on the composition of the flue gases it may become necessary to have one or more non-illustrated electro-filters precede the flue gas washing device. In order to prevent the formation of steam when the flue gases leave the flue 20, it is expedient to heat the flue gases cooled in the flue gas washing device 18, in a flue gas heating device 19 to a temperature at which the formation of steam clouds during the exit of the gases from the flue gas flue 20 will be prevented. With the plant illustrated in FIG. 2 the flue gas heating device 19 may also be designed as heat exchanger and may precede the flue gas washing device 18.

In the plant illustrated in FIG. 3, the preparing range comprises a comminuting and dosing station 31 for the barrels, an addition station 32, and a mixing station 33. From the mixing station 33 the pre-treated wastes pass into the combustion device 34 which with this embodiment of the plant is designed as a rotary furnace. Instead of the rotary furnace 34, also grates of various constructions or other combustion devices such as rotary tables may be employed. The combustion device 34 is followed by a post-burning chamber 35 which may form a unit with the combustion device 34. After the flue gases have passed through the post-burning chambers 35, the flue gases are cooled. More specifically, with this embodiment a steam generator 36 is employed as cooling device. This steam generator comprises a plurality of radiation flues 36a and 36b with contact heating surfaces which may be designed as finned walls.

For cooling the flue gases, the employment of a steam generator is not a necessity. It will be evident that also other cooling devices may be employed as, for instance, a chamber into which water is injected, or air-cooled devices.

If waste substances are burned which emit substances harmful to the ecology, it will be necessary to have the flue gas cooling device 36 followed by a flue gas washing apparatus 37. Such washing apparatus 37 may consist, for instance, of a plurality of stations. In the apparatus 37 the flue gases are cooled to below 100°C, and the harmful substances are separated. Depending on the composition of the flue gases, it may also in this instance become necessary to have one or more non-illustrated electro-filters precede the flue gas washing apparatus. In order to prevent the formation of steam when the flue gases leave the flue 39, it is expedient to heat the flue gases cooled in the apparatus 37 in a flue gas heating device 38 to a temperature at which the formation of steam clouds will be prevented when the flue gases leave the flue 39. The flue gas heating device 38 may also be designed as heat exchanger and may be arranged ahead of the washing apparatus 37.

It is, of course, to be understood that the present invention is, by no means, limited to the specific showing in the drawings, but also comprises any modifications within the scope of the appended claims.

What I claim is:

1. An incinerator plant for burning industrial wastes delivered in containers, which includes a pre-treating section comprising: discharging means for discharging waste containing containers and their contents, comminuting means for comminuting the waste contents of said containers, deep-freezing means adapted to receive and deep freeze wastes from said discharging and comminuting means; and a burning section which includes: a combustion device for receiving and burning the comminuted wastes, a post-burning device communicating with said combustion device for receiving therefrom wastes and further burning incompletely burned wastes, a flue gas cooling device following said post-burning device for receiving and cooling flue gas received from said post-burning device, a flue gas washing device following said flue gas cooling device for receiving flue gas from said flue gas cooling device and washing the thus obtained flue gas, and heating means with flue means for heating up the flue gas received from said flue gas washing device and releasing the washed flue gas through said flue means into the atmosphere.

2. An incinerator according to claim 1, which includes: crushing means interposed between said deep-freezing means and said combustion device for crushing said containers, and mixing means interposed between said crushing means and said combustion device for intermixing the wastes deep frozen in said deep-freezing means and the container material crushed in said crushing means.

3. An incinerator according to claim 1, which includes dust separating means interposed between said flue gas cooling device and said flue gas washing device for withdrawing dust from the flue gas prior to entering said flue gas washing device.

4. An incinerator according to claim 3, in which said dust separating means includes at least one electro-filter.

* * * * *